3,296,191
STABILIZED POLYPROPYLENE CONTAINING A NICKEL OR COBALT PHENOL-PHENOLATE OF A 2,2'-DIHYDROXY-4-ALKOXYBENZOPHENONE
Harold T. Smallwood, Media, Pa., and Sager Tryon, Claymont, Del., assignors, by mesne assignments, to FMC Corporation, San Jose, Calif., a corporation of Delaware
No Drawing. Filed Nov. 17, 1961, Ser. No. 153,190
11 Claims. (Cl. 260—45.75)

The present invention relates to new compositions of matter. More particularly this invention relates to nickel or cobalt derivatives of certain hydroxybenzophenones. It also relates in particular to the use of such derivatives as stabilizers for polypropylene in the presence of light and/or heat.

Various hydroxybenzophenones have been suggested as stabilizers for high molecular weight polymers; e.g., U.S. Patent 2,976,259 discloses various 2,2'-dihydroxy-4-alkoxybenzophenones. However, it has been found that various 2,2'-dihydroxy-4-alkoxybenzophenones are not adequate in and of themselves as light stabilizers for polypropylene fibers, evidence of their inadequacy being illustrated by the Fade-ometer data hereinbelow.

It is accordingly an object of this invention to provide novel nickel and cobalt complexes of 2,2'-dihydroxy-4-alkoxybenzophenones. It is yet another object of this invention to provide novel compositions and processes wherein the foregoing new benzophenone complexes are used to stabilize solid, substantially crystalline isotactic polypropylene, or other 1-alkene polymers, against the degradative action of sunlight. Other objects will be apparent from the description herein.

The new compositions of matter of this invention are nickel, or cobalt, complexes of 2,2'-dihydroxy-4-alkoxybenzophenones which contain no more than about one mol of nickel or cobalt for about every two mols of the benzophenones from which they are derived. It is believed that these complexes have one of the following structures:

(I)
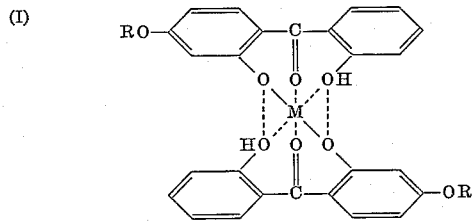

or (II)
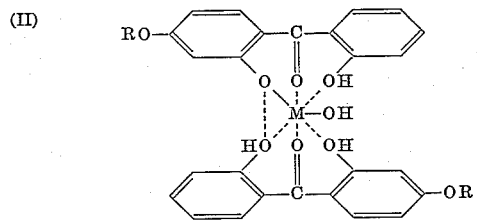

wherein R is an alkyl radical containing 6 to 20 carbon atoms, preferably 8 to 18 carbon atoms, and M is nickel or cobalt. In Formula I the new complexes are illustrated as a half salt, the dotted lines showing chelate structure and/or hydrogen-bonding. The structure in Formula II resembles that of Formula I; however, an added mol of water is illustrated in the former.

In any event, being reaction products of said dihydroxy-alkoxybenzophenones containing one of said metals and at least two free phenolic hydroxyl groups, these complexes are properly designated as nickel, or cobalt, phenolphenolates containing about one mol of nickel, or cobalt, and about two mols of a phenol-phenolate residue of a 2,2'-dihydroxy-4-alkoxybenzophenone wherein the alkoxy radical contains 6 to 20 carbon atoms, and preferably 8 to 18 carbon atoms.

The foregoing complexes are useful as ultraviolet stabilizers for polypropylene as illustrated hereinbelow. Unexpectedly, the precise structure of the benzophenones from which these complexes are prepared is determinative of the efficacy of these complexes for this purpose. On the one hand, neither a nickel or cobalt complex of 2,2'-dihydroxy-4-alkoxybenzophenones having fewer carbon atoms in the alkoxy radical is effective for this purpose; see Control E. On the other hand, nickel and cobalt complexes of 2,4-dihydroxybenzophenone are ineffective also; see Control F.

The complexes of this invention can be prepared by a variety of procedures. In one embodiment one mol of the chosen dihydroxy-alkoxybenzophenone is reacted with one-half of one mol of an alkali metal alkoxide in a suitable solvent for both reactants to produce the half salt thereof and the alkanol corresponding to said alkoxide. This alkali metal half salt is then reacted with a suitable nickel or cobalt salt, e.g., NiCl$_2$, so as to produce the desired complex nickel- or cobalt-phenolphenolate and an alkali metal salt which is insoluble in the solvent used for the reactants. In another embodiment the complexes of this invention are prepared by a direct metathetical reaction between the chosen benzophenone and a cobalt or nickel salt of a weak acid, e.g., acetic acid.

When used as a stabilizer for a poly-1-alkene, such as polypropylene, a stabilizing quantity of one of the complexes of this invention, e.g., 0.005% to 5%, preferably 0.2% to 2%, by weight of the total polymer composition, may be combined with polypropylene by any method suitable for the preparation of homogeneous mixtures. For example, the polymer may be melted and the composition of this invention admixed therewith by milling on heated rolls or by using a Banbury mixer. Alternatively, the stabilizer may be combined, in a solid or liquid state, with a solution or suspension of the polymer in a suitable liquid. In another process, one dissolves the stabilizer in a suitable solvent, admixes powdered polymer therewith, and evaporates the solvent. In another mode of operation, the solid stabilizer is thoroughly dry-mixed with the solid polymer. In general, it is preferable that the mixing process be carried out in an inert atmosphere, or under vacuum, in order to prevent oxidation of the polymer.

Several criteria are used to determine the effectiveness of the composition of this invention as stabilizers for poly-1-alkenes. Since non-stabilized solid, substantially crystalline isotactic polypropylene is normally drastically degraded when exposed to ultra-violet and visible light, particularly the high ultra-violet and the low visible light, the extent of this degradation is measured. One method of determining the extent of degradation involves the use of the Carbon-Arc Lamp Test in the Atlas Fade-ometer substantially in the manner described in Standard Test Method 16A–1957 of the American Association of Textile Chemists and Colorists. According to this test, yarns (multifilaments) or monofilaments under tension are exposed to the light produced by a carbon arc. Every 20 hours the filaments are examined to determine whether or not there has been any breakage. If so, the test is terminated; if not, the test is continued until breakage occurs. Meanwhile, at 60 hour intervals the filaments are tested on an Instron Tensile Tester and compared with unexposed filaments. In the illustrative examples given below, the filaments (i.e., mono- or multifilaments) are wound on standard black faced "mirror" cards (6½ by 9⅓ inches) and secured thereto at the margins with cellophane tape. Winding thereof is performed using a Universal winding device at a tension of 0.75 g., and when so wound, each card contains 3 groups of filaments having 5 to 8 monofilaments or multifilaments in each group.

In addition to degradation caused by exposure to light, non-stabilized polypropylene is rapidly degraded by exposure to elevated temperature during fabrication and use. Virtually none of the materials known as ultra-violet stabilizers for other polymers contribute to the heat stability of that polymer. Unexpectedly, the complexes of this invention impart both light and heat stability of polypropylene. In the examples given below, heat stability is measured on polypropylene in the following manner. Four monofilament fibers from each sample are tied to a glass rod which is then placed in a forced air oven in a horizontal position. Each fiber is held taut in a vertical position by means of a glass weight tied to the lower end of the fiber. This weight applies a tension of about 0.01 to 0.015 gram per denier to the fiber. The oven is held at 125° C. air temperature and the oven life constitutes the number of hours the polypropylene filaments remain exposed to this temperature and atmosphere without breaking.

The following examples are given by way of illustration and not by way of limitation, the scope of the invention being determined by the appended claims. In the examples that follow solid, substantially crystalline isotactic polypropylene is referred to simply as polypropylene.

*Example I*

A one-liter pot was charged with 34.3 grams of 2,2'-dihydroxy-4-n-octoxy benzophenone, 5.5 grams of sodium methoxide and 500 ml. of ethanol. The charge was refluxed for 2 hours and 200 ml. of ethanol containing a small amount of methanol distilled off. Nickelous chloride hexahydrate (11.9 grams) in 400 ml. of ethanol was added and the charge refluxed for 2 hours. Additional ethanol amounting to 450 ml. was distilled off and when the product was cooled, water was added slowly with stirring to precipitate the product. This crystalline dark yellow solid was washed and dried in a filter funnel to give 37.0 grams of the nickel phenol-phenolate of the foregoing benzophenone.

| Analytical | Theory According to Formula I, percent | Found, percent |
|---|---|---|
| Nickel (by weight) | 7.92 | 7.58 |
| Carbon (by weight) | 68.1 | 66.46 |
| Hydrogen (by weight) | 6.80 | 6.83 |
| Oxygen (by difference) | 17.18 | 19.13 |

*Example II*

Example I was repeated using 34.3 grams of 2,2'-dihydroxy-4-octoxy-benzophenone, 5.4 grams of sodium methoxide, a total of 900 ml. of ethanol and 11.9 grams of cobaltous chloride hexahydrate, refluxing for 2 hours after adding the sodium methoxide and an additional 2 hours after adding said cobalt salt. There were recovered 35 grams of a crystalline, dark yellow solid cobalt phenol-phenolate of the foregoing benzophonone.

| Analytical | Theory According to Formula I, percent | Found, percent |
|---|---|---|
| Cobalt | 7.97 | 6.17 |
| Carbon | 68.00 | 68.50 |
| Hydrogen | 7.29 | 7.12 |
| Oxygen (by difference) | 16.74 | 18.21 |

*Examples III and IV*

When Example I is repeated substituting 2,2'-dihydroxy-4-n-dodecoxy-benzophenone on the one hand for the benzophenone thereof and 2,2'-dihydroxy-4-n-octadecoxybenzophene on the other, more than 35 grams of each of the nickel phenol-phenolates of these two benzophenones are recovered as crystalline products.

*Examples V through IX*

Polypropylene monofilaments containing 0.5, 1.0 and 1.5% by weight respectively of the nickel-phenol-phenolate of Example I were exposed to the irradiations of Atlas Fade-ometer in the manner described hereinbefore, the results of these tests being set forth in Examples V through VII respectively of Table 1.

Control polypropylene monofilaments containing 0.0, 0.5, 1.0 and 1.5% by weight respectively of 2,2'-dihydroxy-4-n-octoxy-benzophenone were exposed in the Fade-ometer in the same manner, giving the results tabulated in Table 1 for Controls A, B, C and D respectively.

Polypropylene monofilaments containing 1.0 and 1.5% by weight respectively of the cobalt phenol-phenolate of Example II were exposed in the Fade-ometer as above, giving the results tabulated in Table 1 for Examples VIII and IX.

TABLE 1

| Example | Fade-ometer Hours to Break | Tenacity Retained, Fade-ometer Hours |
|---|---|---|
| V | 140 | 46.5% at 120. |
| VI | 200 | 85.0% at 120. |
| VII | 280 | 60.0% at 200. |
| A | 60 | 21.4% at 40. |
| B | 40 | |
| C | 60 | |
| D | 60 | |
| VIII | 120 | |
| IX | 140 | |

*Example X*

When duplicate monofilaments prepared according to Example VII were exposed in an air oven at 125° C. in the manner described hereinabove, one filament failed at 113.5 hours, a second one at 119.5 hours and the final two filaments failed at 139.5 hours.

*Example XI*

Polypropylene monofilaments containing 2% by weight of the nickel-phenol-phenolate of Example I were exposed in an air oven at 125° C. in the manner described hereinabove, two filaments breaking at 141.5 hours and the other two at 161.5 hours.

CONTROL E

A two-liter pot was charged with 49 grams of 2,2'-dihydroxy-4-methoxybenzophenone, 11 grams of sodium methoxide and one liter of ethanol. Nickelous chloride hexahydrate (24 grams) in 500 ml. of ethanol was added and the mix refluxed for 2 hours. The liquid product was evaporated to 500 ml. on a steam bath. Water was added slowly with stirring until the product precipitated out. The crystalline yellow solid was then washed and dried in a filter funnel to give 51 grams.

| Analytical | Theory According to Formula I, percent | Found, percent |
|---|---|---|
| Nickel | 11.18 | 8.37 |
| Carbon | 64.1 | 62.48 |
| Hydrogen | 4.22 | 4.56 |

When polypropylene monofilaments containing 1% by weight of the foregoing product were exposed in the Atlas Fade-ometer, they failed in less than 40 hours.

CONTROL F

A reaction vessel was charged with 12.8 grams of 2,4-dihydroxybenzophenone, 3.2 grams of sodium methoxide and 200 ml. of ethanol. The charge was refluxed for 0.5 hours and 20 ml. of ethanol containing a small amount of methanol then distilled off. Nickelous chloride hexahydrate (7.1 grams) in 200 ml. of ethanol was added and this charge refluxed for 2 hours, followed by the distillation of an additional 200 ml. of ethanol. When the product had cooled to room temperature, water was slowly added with stirring to precipitate the product, a crystalline dark yellow solid. This product was washed and dried in a filter funnel to give 13 grams thereof.

| Analytical | Theory According to Formula I, percent | Found, percent |
|---|---|---|
| Nickel | 12.1 | 10.6 |
| Carbon | 64.4 | 65.2 |
| Hydrogen | 3.7 | 3.8 |
| Oxygen (by difference) | 19.8 | 20.4 |

Polypropylene monofilaments containing 1% by weight of the product so prepared broke after 60 to 80 hours exposure in the Fade-ometer.

*Examples XII and XIII*

Polypropylene monofilaments are prepared containing 1.0% by weight of the nickel-phenol-phenolate of 2,2'-dihydroxy-4-dodecoxybenzophenone (Example III). Another set of polypropylene monofilaments are prepared containing 1% by weight of the nickel-phenol-phenolate of Example IV. When exposed in the Fade-ometer for 100 hours in the manner described hereinabove, none of these filaments fail.

The invention claimed is:

1. A composition of matter comprising solid, substantially crystalline isotactic polypropylene and a stabilizing quantity of a metal-phenol-phenolate of a 2-,2'-dihydroxy-4-alkoxybenzophenone wherein said metal is selected from the group consisting of nickel and cobalt, said alkoxy group contains between 6 and 20 carbon atoms, and the mol ratio of metal to benzophenone is about 1 to 2.

2. The composition of claim 1 wherein said stabilizing quantity is from about 0.005% to about 5% by weight of said composition.

3. The composition of claim 1 wherein said stabilizing quantity is from about 0.2% to about 2% by weight of said composition.

4. The composition of claim 3 wherein said metal is divalent nickel.

5. The composition of claim 4 wherein said alkoxy group is n-octoxy.

6. The composition of claim 4 wherein said alkoxy group is n-dodecoxy.

7. The composition of claim 4 wherein said alkoxy group is n-octadecoxy.

8. The composition of claim 3 wherein said metal is divalent cobalt.

9. The composition of claim 8 wherein said alkoxy group is n-octoxy.

10. The composition of claim 8 wherein said alkoxy group is n-dodecoxy.

11. The composition of claim 8 wherein said alkoxy group is n-octadecoxy.

References Cited by the Examiner

UNITED STATES PATENTS

| | | | |
|---|---|---|---|
| 2,853,521 | 9/1958 | Hardy et al. | 260—45.95 |
| 2,971,940 | 2/1961 | Fuchsman et al. | 260—45.75 |
| 2,971,968 | 2/1961 | Nicholson et al. | 260—45.75 |
| 3,028,363 | 4/1962 | Robbins et al. | 260—45.95 |
| 3,030,333 | 4/1962 | Coppinger | 260—45.95 |
| 3,072,601 | 1/1963 | Breslow | 260—95.75 |
| 3,098,863 | 7/1963 | Dessauer et al. | 260—439 |

LEON J. BERCOVITZ, *Primary Examiner.*

ARNOLD D. SULLIVAN, *Examiner.*

A. H. KOECKERT, G. W. RAUCHFUSS,
*Assistant Examiners.*